Dec. 27, 1966   W. C. WOELLMER   3,293,926
SEALED ROTARY DRIVE APPARATUS
Filed Dec. 23, 1964
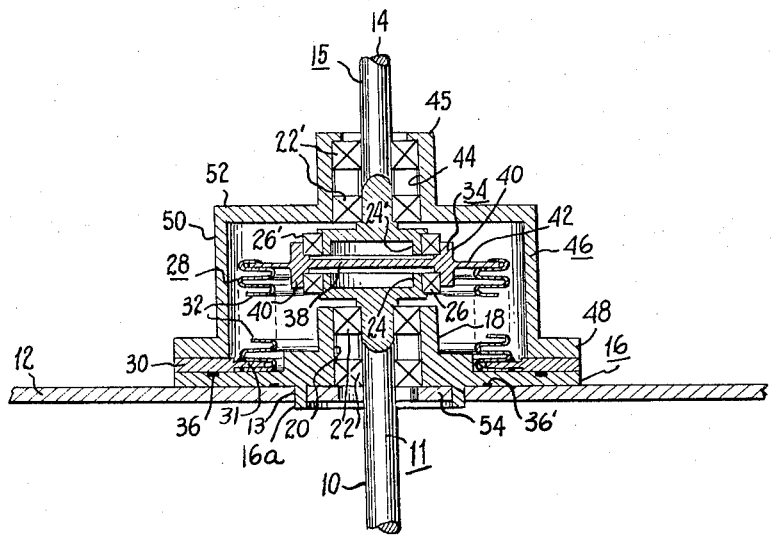
INVENTOR.
WILLIAM C. WOELLMER
BY Edward J. Norton
ATTORNEY

United States Patent Office 3,293,926
Patented Dec. 27, 1966

3,293,926
SEALED ROTARY DRIVE APPARATUS
William C. Woellmer, Levittown, Pa., assignor to Radio Corporation of America, a corporation of Delaware
Filed Dec. 23, 1964, Ser. No. 420,524
1 Claim. (Cl. 74—18)

This invention relates to an apparatus for rotating a shaft in one ambient condition by a motive means in another ambient condition while preserving one of the ambient conditions.

It is often necessary to cause rotation within a sealed container by a motor outside of the container and without breaking or injuring the seal. Drive devices are known including flexible seals which are oscillated but not rotated by a power means at one side of the seal and in which the oscillations are converted into rotation by follower apparatus on the other side of the flexible seal. Such prior art devices are relatively complicated and require parts of different shapes for causing oscillation of the flexible seal and for changing this oscillation into rotation. Such prior art devices are therefore expensive to make and to repair.

It is an object of this invention to provide an improved drive apparatus for causing rotary motion through a seal.

A further object of this invention is to provide a drive mechanism for causing rotary motion through a seal in which the drive and follower parts on opposite sides of the seal are interchangeable.

It is a further object of this invention to provide such a drive mechanism in which the seal itself includes a part requiring no orientation with respect to other parts of the seal.

It is an object of this invention to provide an easily made, easily assembled and relatively economical apparatus for permitting a rotary power means on the outside of a sealed container to cause rotary motion within the sealed container, and vice versa.

The novel features of the invention, both as to its organization and method of operation, as well as additional objects and advantages thereof, will be understood more readily from the following description when read in conjunction with the accompanying drawing in which:

The sole figure is a cross-sectional view of one embodiment of a rotary drive apparatus constructed according to this invention.

Referring to the figure, a shaft 10, comprising a portion of a shaft assembly 11 and extending through a hole 13 in the wall 12 of a sealed container is to be rotated by a motor (not shown) outside of the wall 12 by means of a drive shaft 14 comprising part of a second shaft assembly 15. A bearing plate 16 is hermetically fixed to the upper side (as viewed in the figure) of the wall 12 surrounding the hole 13. The bearing plate 16 has a central boss 18 extending away from the wall 12, there being a bore 20 through the boss 18. A pair of antifriction bearings 22 are mounted in the bore 20, one at each end thereof, and the shaft 10 is rotatably mounted in the bearings 22. The upper end of the shaft assembly 11 is formed into a disk 24 which is eccentrically positioned with respect to the shaft 10, and an antifriction bearing 26 is fixed to the circumference of the disk 24. While the disk 24 is shown as being hollowed out, the disk 24 may be solid if so desired.

A flexible vacuum seal 28 is hermetically fixed to the bearing plate 16 surrounding the boss 18. This seal 28 comprises a ring element 30, a flexible corrugated cylindrical bellows 32 and a motion transmitting element 34. The ring 30 can have an inner extension 31 which is thinner than the outer portion of the ring 30. The thicker portion of the ring 30 is hermetically fixed to the bearing plate 16 surrounding the boss 18, and an O-ring 36 is provided in a circular groove in the top of the plate 16 and in contact with the lower surface of the ring 30 to provide a hermetic seal of the ring 30 to the plate 16. One end of the bellows 32 is hermetically sealed to the inner portion 31 of the ring 30, and the other end of the bellows 32 is hermetically fixed to an outer rim or flange portion 42 of the motion transmitting or driven element 34 which is described in more detail below. Therefore, ambient conditions inside the bellows 28 and communicating with the space below the plate 12 as viewed in the figure and the space inside the container wall 12 (which includes the part below the wall 12 visible in the drawing) are hermetically sealed from ambient conditions outside of the container 12.

The motion transmitting element 34 is circularly symmetrical about an axis through the center thereof and it is also symmetrical about a plane perpendicular to its axis and through the center thereof. The element 34 comprises a central plate portion 38 having a pair of circular cylindrical members or, in the example given, flanges 40 extending therefrom concentric with the central plate 38. The flanges 40 extend in opposite directions from the plate portion 38. The circular rim portion 42 extends radially outwardly beyond the cylindrical flanges 40. The rim portion 42 may be thinner than the plate portion 38.

The outside shaft assembly 15 including a disk 24′ at the end thereof is identical in shape with the shaft assembly 11 including the disk 24 but inverted in position. A bearing 26′ is fitted to the periphery of the disk 24′. The bearing 26 is fitted into the lower flange 40 and the similar bearing 26′ is fitted into the upper flange 40.

The shaft assembly 15 is held in place by two bearings 22′ each surrounding the shaft 14 and each fixed in a bore 44 through an upstanding boss 45 comprising part of an upper bearing member 46. The bearing member 46 includes a flange 48 which may be fixed to the ring 30 and a cylinder 50 extending laterally of the flange 48 (axially) from the inner end thereof, the cylinder 50 forming a chamber large enough to contain the bellows 32 and the motion transmitting element 34 and to permit necessary motion thereof as will be explained. The upper end of the cylinder 50 is closed by a radially inwardly extending plate 52 having a central hole therethrough, the boss 45 extending upwardly from the inner edge of the plate 52.

The wall 12 may be part of a housing. A positioning rim 16a is turned on the bearing plate 16 to extend through the hole 13. A retaining ring 54 fits within the positioning rim 16a and is attached to the bearing plate 16 by screws or the like (not shown) to retain the bearing assembly 22. Another O-ring 36′ is provided in a suitable depression on the opposite face of the bearing plate 16 to seal against the wall 12. The O-rings 36, 36′ assume hermetical seal between the parts.

As the shaft 14 is rotated by a motor (not shown), the eccentrically positioned disk 24′ rotates, causing the driven element 34 to oscillate. The element 34 is prevented from rotating about its center by the bellows 32. The bearing 26′ reduces friction between the disk 24′ and the element 34. The disk 24, due to its connection with the element 34 by means of the bearing 26, follows the oscillations of the element 34, and to do so, the disk 24 must rotate thereby rotating the shaft 10. Since the seal provided by the sealing device 28 is not broken during oscillations of the element 34 and of the bellows 32 to which it is fixed, the hermetic seal provided by the device 28 remains intact. The sealed joint rotation transmitting drive thus formed has a greater life expectancy, has reduced backlash, increased smoothness of drive, and increased accuracy of correspondence and of concentricity between the drive and driven shafts compared to prior sealed joint rotation transmitting drives.

It will be noted that the bearings 22 and 22' may be identical, that the bearings 26 and 26' may also be identical and that the shaft assemblies 11 and 15 may be identical. Furthermore, the motion transmitting element 34 is symmetrical about a plane through the center thereof perpendicular to the axis thereof. Therefore, the above described sealed rotary drive apparatus is easier and cheaper to make than prior art devices since the number of different parts is reduced and since in assembling the seal 28, the element 34 need not be orientated with respect to the bellows 28. That is, either side of the driven element 34 may face inwardly of the seal.

Although a single form of sealed rotary drive apparatus has been described, it will undoubtedly be apparent to those skilled in the art that variations thereof are possible within the spirit of the present invention. Either shaft 14 of 11 may be used as the drive shaft and the other as the driven shaft. The bearing plate 16 may be surrounded by the ring 30 which may be hermetically sealed to the wall 12 and the flange 48 of the bearing member 46 may be fixed directly to the wall or to the ring 30, whereby hermetic connection of the bearing plate 16 to the wall 12 is unnecessary. Or the flanges 40, 40 may fit into the hollowed out portions of the disks 24 and 24'. Hence it should be understood that the foregoing description is to be considered as illustrative and not in a limiting sense.

What is claimed is:

A sealed rotary drive apparatus for mounting on a wall of a container comprising,
  a bearing plate fixed to said wall and surrounding a hole therethrough,
  said bearing plate having a dependent positioning ring fitting into said hole in said wall,
  said bearing plate also having a first hollow cylindrical boss extending therefrom in the direction away from said ring,
  a shaft having an axis and having a circular disk extending perpendicularly to said shaft axis from an end of said shaft, and eccentrically mounted with respect to said shaft,
  said shaft extending through and being rotatably mounted in said first boss with said disk beyond said boss in the direction away from said ring,
  a bearing member fixed to said bearing plate and forming a chamber with said bearing plate,
  said bearing member having a second hollow cylindrical boss extending from said bearing member in a direction away from said wall,
  a second shaft and circular disk identical with said first shaft and disk, said second shaft extending through and being rotatably mounted in said second boss, the axes of said shafts being aligned and said disks being positioned in said chamber,
  and means for mechanically coupling said disks including,
  a ring positioned between said bearing plate and said bearing member and surrounding said hole in said wall,
  a bellows having two ends, one end of said bellows being hermetically fixed to said ring,
  and a motion transmitting element, said motion transmitting element comprising an outer rim hermetically fixed to the other end of said bellows,
  said motion transmitting element also comprising a pair of cylindrical members extending from opposite sides of said rim,
  said disks each being received in a cooperating relationship with a respective one of said cylindrical members,
  means to hermetically seal said bearing plate to said wall and said ring to said bearing plate, said sealing means each comprising a resilient O-ring respectively positioned between said bearing plate and said wall and between said ring and said bearing plate.

References Cited by the Examiner

UNITED STATES PATENTS 2,497,867  2/1950  Cymmer _____ 74—17.8
3,208,289  9/1965  Hutter et al. _____ 74—18

MILTON KAUFMAN, *Primary Examiner.*